United States Patent [19]

Yoshida

[11] Patent Number: 4,736,094

[45] Date of Patent: Apr. 5, 1988

[54] FINANCIAL TRANSACTION PROCESSING SYSTEM USING AN INTEGRATED CIRCUIT CARD DEVICE

[75] Inventor: Shinya Yoshida, Kyoto, Japan

[73] Assignee: Omron Tateisi Electronics Co., Kyoto, Japan

[21] Appl. No.: 717,849

[22] Filed: Mar. 29, 1985

[30] Foreign Application Priority Data

| Apr. 3, 1984 | [JP] | Japan | 59-67292 |
| Apr. 6, 1984 | [JP] | Japan | 59-69664 |
| Apr. 6, 1984 | [JP] | Japan | 59-69665 |
| Apr. 10, 1984 | [JP] | Japan | 59-72532 |
| Apr. 16, 1984 | [JP] | Japan | 59-77103 |

[51] Int. Cl.$^4$ .............................................. G06F 15/30
[52] U.S. Cl. .................... 235/379; 235/380; 235/492; 364/406
[58] Field of Search ............... 235/379, 492, 380; 364/406; 340/825.33; 283/83

[56] References Cited

U.S. PATENT DOCUMENTS

| 4,001,550 | 1/1977 | Schatz | 235/379 |
| 4,007,355 | 2/1977 | Moreno | 235/379 |
| 4,114,027 | 9/1978 | Slater et al. | 340/825.33 X |
| 4,321,672 | 3/1982 | Braun et al. | 235/379 X |
| 4,593,936 | 6/1986 | Opel | 283/83 |

*Primary Examiner*—David L. Trafton
*Attorney, Agent, or Firm*—Stevens, Davis, Miller & Mosher

[57] ABSTRACT

A financial transaction processing system comprising an IC card (6) for use in transaction with a financial body, terminals (21e-24e) communicating with the IC card (6) and centers (21-24) provided for each financial body. The IC card (6) comprises a read only memory (2) for storing data for specifying transaction accounts corresponding to a plurality of financial bodies and data of a single secret number common to the financial bodies. When the IC card (6) is inserted into the terminal, a customer can designate a specific account which he wishes to use, by operating a keyboard (20) provided in each of the terminals. In response to such designation, the corresponding account specifying data is read out from the ROM, but if the corresponding account is not stored in the ROM 2, a transaction can not be made. In addition, the account specifying data as read out and a claimed amount entered by a customer are sent to a center for the financial institutions carrying account where processing for payment is performed. However, if and when the balance is not sufficient, the center instructs the customer to select another account. A random access memory (3) included in the IC card (6) is made to store the amount after payment processing in the center, so that a transaction can be made with a cash dispensing terminal in an offline manner, by using such an IC card (6).

8 Claims, 12 Drawing Sheets

FIG. 3

(ACCOUNT FLAG)

| | NAME OF ACCOUNT | HEAD ADDR. | NUMBER OF DIG. |
|---|---|---|---|
| 1 | | | |
| 2 | ⁄⁄ | ⁄⁄ | ⁄⁄ |
| 3 | ⁄⁄ | ⁄⁄ | ⁄⁄ |
| | | | |
| n | ⁄⁄ | ⁄⁄ | ⁄⁄ |

SECRET NO.

{ FIRST ACCOUNT }
- ID MARK
- BANK NO.
- BRANCH NO.
- ACCOUNT NO.
- EFFECTIVE TIME PERIOD

{ SECOND ACCOUNT }
- ID MARK
- BANK NO.
- BRANCH NO.
- ACCOUNT NO.
- EFFECTIVE TIME PERIOD

{ THIRD TO (n-1)TH ACCOUNT }

{ nTH ACCOUNT }
- ID MARK
- BANK NO.
- BRANCH NO.
- ACCOUNT NO.
- EFFECTIVE TIME PERIOD (ROM)

FIG. 4

- AREA M1 FOR DEPOSIT IN FIRST ACCOUNT
- AREA M2 FOR DEPOSIT IN SECOND ACCOUNT
- AREA M3 FOR DEPOSIT IN THIRD ACCOUNT
- ⋮
- AREA Mn FOR DEPOSIT IN nTH ACCOUNT
- AREA FOR ACCESSING ACCOUNT NUMBER (RAM)

FINANCIAL TRANSACTION PROCESSING SYSTEM USING AN INTEGRATED CIRCUIT CARD DEVICE

BACKGROUND OF THE INVENTION

1. Field of the Invention

The present invention relates to a financial transaction processing system using an integrated circuit (IC) card. More particularly, the present invention relates to a financial transaction processing system comprising an integrated circuit having a storage area for storing data specifying a plurality of transaction accounts corresponding to a plurality of financial institutions, such as a bank and a credit company, and a terminal for selecting from such a plurality of transaction accounts a specific account which a customer wishes to select so that a transaction can be performed.

2. Description of the Prior Art

Presently, a magnetic card such as a so-called cash card and credit card has been widely used for payment, deposit, transfer and the like through an online system in financial institutions such as a bank and a credit company. Data for identifying a customer, such as a secret number, is magnetically stored in the magnetic card. When a transaction is performed, a customer goes to a bank at which he has a bank account, with such magnetic card, where he inserts his card into a terminal such as an automatic teller machine (ATM) or a cash dispenser (CD) installed therein and enters into the terminal the data necessary for transactions, such as a secret number, and a kind of transaction and a transaction amount by operating inputting means, such as a keyboard, in accordance with predetermined procedures. The secret number information read out by the terminal and the information of each of transactions entered into the terminal by a customer are transmitted to a center of the bank, and in response to the transmitted information, a center file is renewed and then an instruction indicating that the transaction is performed is provided to the terminal. Thus, any transaction is performed between the customer and the terminal.

In addition, according to a recent online system, a communication can be made possible among different banks, in which system it is possible for a customer to make payment from his bank account by using a terminal of another bank at which he has no bank account. For example, if and when a card of "A" bank at which a customer has a bank account is used with respect to a terminal of "B" bank at which he has no bank account, the transaction data read out, in the "B" bank, from the card of "A" bank is transmitted to a center of the "B" bank, from which the data is again transferred to the center of "A" bank. Then, in the center of the "A" bank, it is determined whether there is his bank account or not and then, if there is his bank account at the "A" bank, the corresponding file is renewed in accordance with transaction information. In addition, an instruction indicating permission of a transaction is transmitted to the terminal of the "B" bank wherein a desired transaction can be achieved between the card owner and the terminal of the "B" bank.

Furthermore, according to the conventional online system, a present balance in an account, that is, an upper limit of payable amount is recorded in the card, so that cash can be dispensed within the upper limit of the payable amount recorded in the card through an offline transaction of a terminal during a time period other than the online system operating time period.

Meanwhile, in a recent social circumstances where cards such as a cash card and a credit card are increasingly used, a person usually must own several kinds of cards and select from these cards a necessary card for use. It is expected that such tendency will progressively increase. However, if each individual comes to own a plurality of cards, that is, a plurality of financial transaction accounts, a secret number must be set for each card and hence a card may be erroneously selected and/or a secret number erroneously entered, which complicates the handling and storage of the cards complicated.

In order to avoid such situation, it is desirable that data of transaction accounts corresponding to all of the financial institutions which each individual has business relations with, and a single secret number common to all of the financial institutions can be stored in a single card so that only one account that a customer is going to transact business with can be selected from these accounts.

In addition, if and when a number designates an erroneous account number which is not included in the stored account numbers, the customer can not know why the transaction is not interrupted or inhibited unless the terminal provides a response and hence the customer will be at a loss. Therefore, in such a situation, it is desirable that a terminal can show the customer that the transaction is impossible. Furthermore, if and when lack of the balance in a selected account occurs, it is desirable to give a customer a further chance to select another account number, without immediately interrupting or stopping the transaction.

In addition, in order to eliminate risks that a customer must carry excessive cash, it is desired that a system can be realized wherein a cash dispensing is made all the time (including holidays such as Saturday and Sunday) through an offline transaction in a terminal, when an online system operating time period has passed. Therefore, it is desirable that a payable balance in the account can be recorded in the card in which the data of the above described transaction accounts are stored.

However, a conventional magnetic card has a limitation with respect to storage capacity, that is, there is a problem that only information concerning a single financial institution can be stored in a single card. Furthermore, it is assumed that for payment in an offline manner, a payable balance was recorded in a card during an operating time period of an online system, in which case if and when the payment is made in an offline transaction manner after an online system operating time period has passed, the processing in the center necessary for such payent will not be made until the time of the next day at the earliest. Therefore, there is also a problem that there exists some risks that there is a time period when a difference between a actual balance and a nominal balance in the center occurs, which is a cause of unfair use.

SUMMARY OF THE INVENTION

Briefly stated, the present invention is directed to a financial transaction processing system comprising an integrated circuit card for use in financial transaction processing and a terminal communicating with the integrated circuit card, the integrated circuit card including first data storage means having a storage area for storing data specifying transaction accounts corresponding to a plurality of financial institutions, and the terminal including account designating means for designating a specific account which a customer wishes to use, out of the plurality of transaction accounts corresponding to the plurality of financial institutions. The integrated circuit card further includes transaction data outputting means responsive to said account designating means for reading out data specifying the account designated by said account designating means from the data specifying transaction accounts corresponding to said plurality of financial institutions stored in the storage area and for transmitting the read data to the terminal.

In accordance with another aspect of the present invention, the financial transaction processing system further comprises a central apparatus provided for each of the plurality of financial institutions, wherein said terminal further includes claimed amount information entering means for entering information concerning a first claimed amount, transaction data transmitting means for transmitting the first claimed amount information and the designated account specifying data to the center apparatus which the designated account belongs to. The center apparatus includes a center file for storing information associated with related accounts, including balance information of the related accounts, and account balance collating means for determining whether the first claimed amount is less than the balance of the designated account stored in the center file and for transmitting a signal indicating lack of balance when the first claimed amount is more than the balance. The terminal further includes instructing means responsive to said lack-of-balance-indicating signal for instructing a customer to designate a new account from said plurality of transaction accounts expect for the designated account, using the account designating means.

In accordance with a further aspect of the present invention, the financial transaction processing system further comprises a center apparatus provided for each of the plurality of financial institutions, wherein the integrated circuit card further includes second data storage means having a writable and readable storage area at least for amount information, and the terminal further includes claimed amount information entering means for entering first claimed amount information, transaction data transmitting means for transmitting the first claimed amount information and the data specifying the designated account to the center apparatus which the designated account belongs to, and writing means for writing the first claimed amount information and the designated account specifying data into the storage area of the second storage means. The central apparatus further includes a center file for storing information associated with the related accounts, including balance information of the accounts included in the file and payment processing means responsive to the first claimed amount information received from the transaction data transmitting means and the desginated account specifying data for making a payment processing based on the balance of the designated account stored in the center file.

In accordance with a further aspect of the present invention, a financial transaction processing system further comprises a cash dispensing terminal for communicating with the integrated circuit card having the storage area of the second data storage means in which the first claimed amount information and the designated account specifying data are stored in the second data storage means, the cash dispensing terminal including entering means for entering a second claimed amount.

The integrated circuit card further includes means for comparing the second claimed amount as entered with the first claimed amount information stored in the storage area of the second data storage means for providing a payment instruction instructing the cash dispensing terminal to dispense the cash corresponding to the second claimed amount when the second claimed amount is less than the first claimed amount.

In accordance with a still further aspect of the present invention, the integrated circuit card further includes impossible transaction indication signal outputting means for generating a signal indicating an impossible transaction to the terminal when the account designated by the account designated means is not included in the transaction accounts for the plurality of financial institutions stored in the storage area. In accordance with a still further aspect of the present invention, the account designating means designates, from the plurality of transaction account corresponding to the plurality of financial institutions, the specific account of specific financial institution which the terminal belongs to.

In accordance with a still further aspect of the present invention, the account designated means further includes means for selecting and designating a desired account from the plurality of financial institution's transaction accounts.

In accordance with other aspect of the present invention, the first data storage means in the integrated circuit card further includes a storage area for storing a single secret number information common to the plurality of financial institutions.

Accordingly, a primary object of the present invention is to provide a financial transaction processing system capable of performing a transaction with a desired transaction account using only a single integrated circuit, even if the customer has a plurality of transaction accounts at a plurality of financial institutions, whereby complexity in handling and managing a plurality of cards can be eliminated.

Another object of the present invention is to provide financial transaction processing system in which a cash dispensing from a terminal is made possible in an offline manner as necessary, even if an operating time period of an online system has passed.

A primary advantage of the present invention is that a single integrated circuit can store data concerning a plurality of transaction financial institutions at which a customer has the transaction accounts and when a transaction is done, a customer directly goes to a bank at which he has a bank account, or he selects a specific account which he wishes to use, from the plurality of transaction accounts data stored in the integrated circuit card through a terminal, so that a necessary transaction can be performed.

Another advantage of the present invention is that if and when a lack of the balance in the selected account occurs, a customer is informed of such lack of the balance so that the customer can again select another account, and hence the transaction need not be repeated from the start, thereby to improve efficiency of operating the terminal.

A further advantage of the present invention is that since cash dispensing from a terminal in an offline manner is made possible, a risk of a person having a cash with him is reduced and, in addition, since payment processing in a center is completed when a claimed amount is entered in an integrated circuit, unfair use which might be caused due to delay of payment processing in the center can be prevented.

A further advantage of the present invention is that a customer can retry to designate a correct account without any trouble, even if an erroneous account which is not stored in the integrated circuit card is designated, since the terminal can indicate an impossible transaction to the customer.

A further advantage of the present invention is that since a secret number is common with respect to all of the transaction accounts, a customer can simply learn only one secret number by heart, so that complexity in handling the card can be eliminated.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a memory map of a read only memory contained in an integrated circuit of one embodiment of the present invention;

FIG. 4 is a memory map of a random access memory contained in an integrated circuit card of one embodiment of the present invention;

DETAILED DESCRIPTION OF THE PREFERRED EMBODIMENTS

Figure 1:
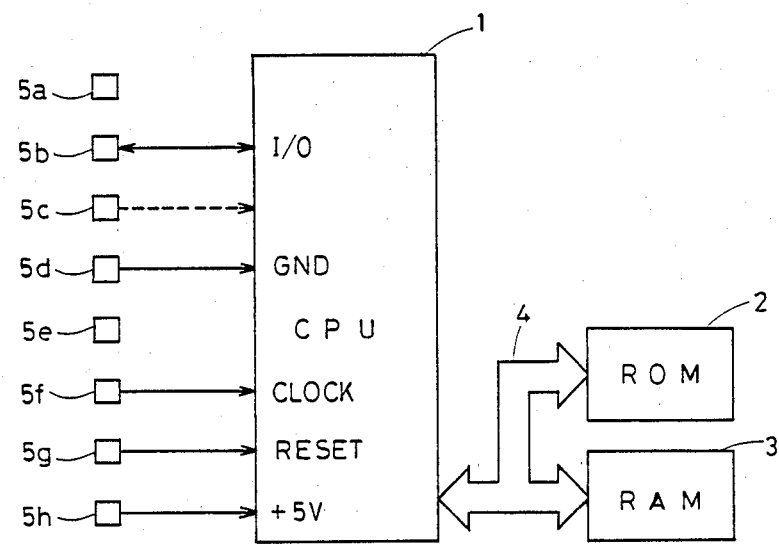
FIG. 1 is a schematic block diagram showing an electric structure of an integrated circuit of one embodiment of the present invention.

FIG. 1 is a schematic block diagram showing an electric structure of an integrated circuit card constituting a financial transaction processing system of one embodiment of the present invention.

An integrated circuit card is of the same size and configuration as a conventional magnetic card such as a cash card and a credit card and contains therein at least a memory, such as a read only memory and a random access memory, a central processing unit (CPU) and a plurality of contacts (usually eight contacts) connecting to a terminal. A conventional magnetic card has a small storage capacity and the information stored in the magnetic card can be easily decoded. As compared with such conventional magnetic card, the feature of the IC card resides in the point that the IC card has a large amount of storage capacity and the programming is made in such a manner that it can not be easily readout so that the information stored therein can be prevented from being decoded by others, whereby a security is enhanced. In addition, the IC card itelf can provide a request to a terminal.

Referring to FIG. 1, the IC card is provided with contacts 5a to 5h for connecting to a terminal. Of these contacts, the contact 5b is used for communicating between the IC card and the terminal. The contacts 5d and 5h are used for supplying a power supply (0V, +5V) from the terminal to the central processing unit 1 of the IC card. The contact 5f is used for supplying clock signals to the central processing unit 1 and the contact 5g is used for supplying a reset signal to the CPU1. The contact 5c is used for supplying a power for altering the storage contents in the RORM only when the storage contents in the ROM is altered. The remaining contacts 5a and 5e are extra contacts. In addition, the CPU1, ROM2 and RAM3 are interconnected through a data bus 4. The CPU controls operation of each constituent elements.

Figure 2:
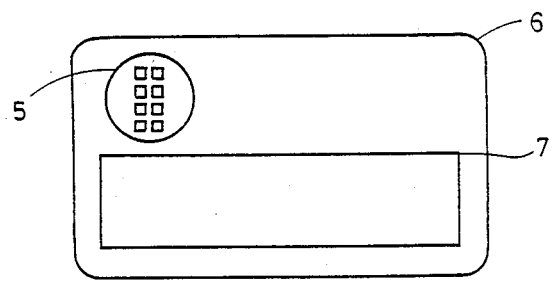
FIG. 2 is a plan view of an integrated circuit card of one embodiment of the present invention.

FIG. 2 is a plan view of an integrated circuit card constituting one embodiment of the present invention. Referring to FIG. 2, a front panel of an integrated circuit card body 6 has a group of contacts 5 (which is comprised of contacts 5a through 5h shownin FIG. 1), which are connected to an integrated circuit card reader provided in a terminal, when the IC card 6 is inserted to the terminal. In addition, the IC card 6 has also an embossed display 7 displaying a name of card owner, etc.

FIG. 3 is a drawing showing a memory map of an integrated circuit card constituting an embodiment of the present invention, which includes data specifying transaction accounts corresponding to a plurality of banks at which the card owner has bank accounts, stored in a storage area of the ROM 2 of the IC card. Referring to FIG. 3, there exist the first, the second, . . . the n-th account flats and head addresses of transaction account data corresponding to these account flags, respectively, and the like are stored for each account flag. There is a single secret number common to all of the accounts, followed by detailed transaction data for the first to the n-th accounts.

FIG. 4 is a diagram showing a memory map of a random access memory of an integrated circuit card constituting one embodiment of the present invention, which includes areas for deposit in which a limited payable amount for each account is stored for the purpose of payment in an offline manner. Referring to FIG. 4, amount of payment can be stored in each area for deposit, such as first area, second area, . . . n-th area.

Figure 5:
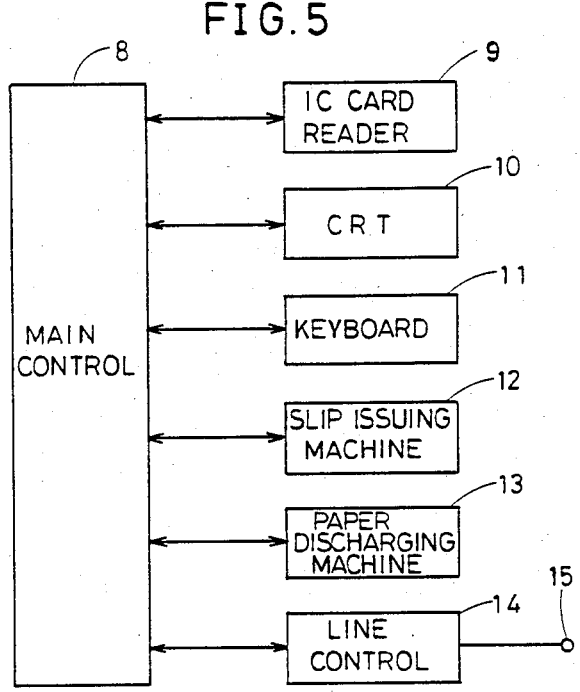
FIG. 5 is a schematic block diagram showing an electric structure of a terminal for use in an integrated circuit of one embodiment of the present invention.

FIG. 5 is a schematic block diagram showing an electric structure of a terminal communicating with an integrated circuit card constituting an embodiment of the present invention shown in FIGS. 1 to 4. Referring to FIG. 5, an integrated circuit card reader 9 is a unit for communicating with the CPU 1 of the inserted IC card through the contact 5. A CRT 10 is a unit for indicating procedures for transaction to a customer and for making a customer select a desired transaction account. A keyboard 11 is a unit used for entering a desired account and a secret number so that a customer can communicate with the terminal. A slip issuing machine 12 is a unit for issuing a slip in response to permission of payment from a center. A paper discharging machine 13 is a unit for discharging a paper to a customer. Each of these units is connected to a main control 8 through internal data bases and the main control 8 controls operation of these units. The main control 8 is connected to a central processing unit (not shown) of a center of each bank through a line control 14 and an input/output terminal 15.

Figure 6:
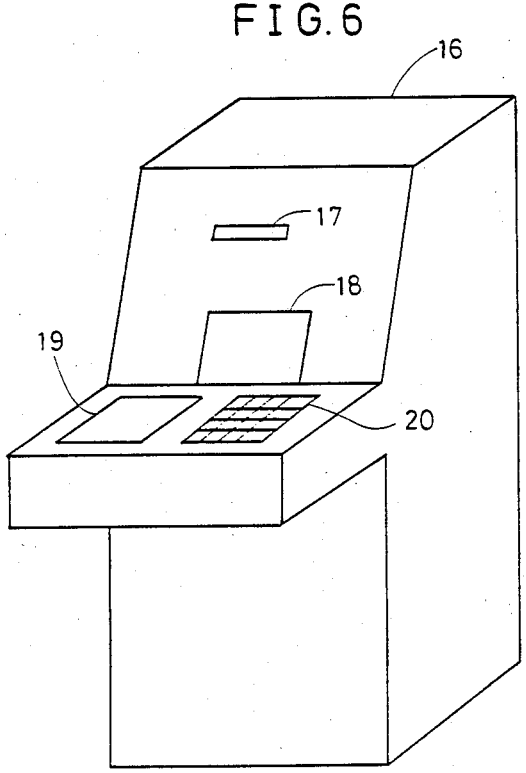
FIG. 6 is a perspective view of a terminal for use in an integrated circuit of one embodiment of the present invention.

FIG. 6 is a perspective view of a terminal for an integrated circuit card constituting one embodiment of the present invention. Referring to FIG. 6, a main body 16 of a terminal for use with an integrated circuit card is provided with an IC card inserting opening 17 and a slip/paper discharging opening 18 in a vertical surface thereof and a CRT 19 and a keyboard 20 in a horizontal surface, that is, an operating panel. The IC card inserting opening 17 is for insertion of the IC card when a customer is to perform a transaction, the slip/paper discharging opening 18 is used for presenting to a customer papers and slip upon payment, which is opened only when payment is made. The CRT 19 is used for providing a customer with information and instructions regarding operational procedure and the keyboard 20 is used for entering a number of corresponding to a desired transaction account, a secret number and a claimed amount.

Figure 7:
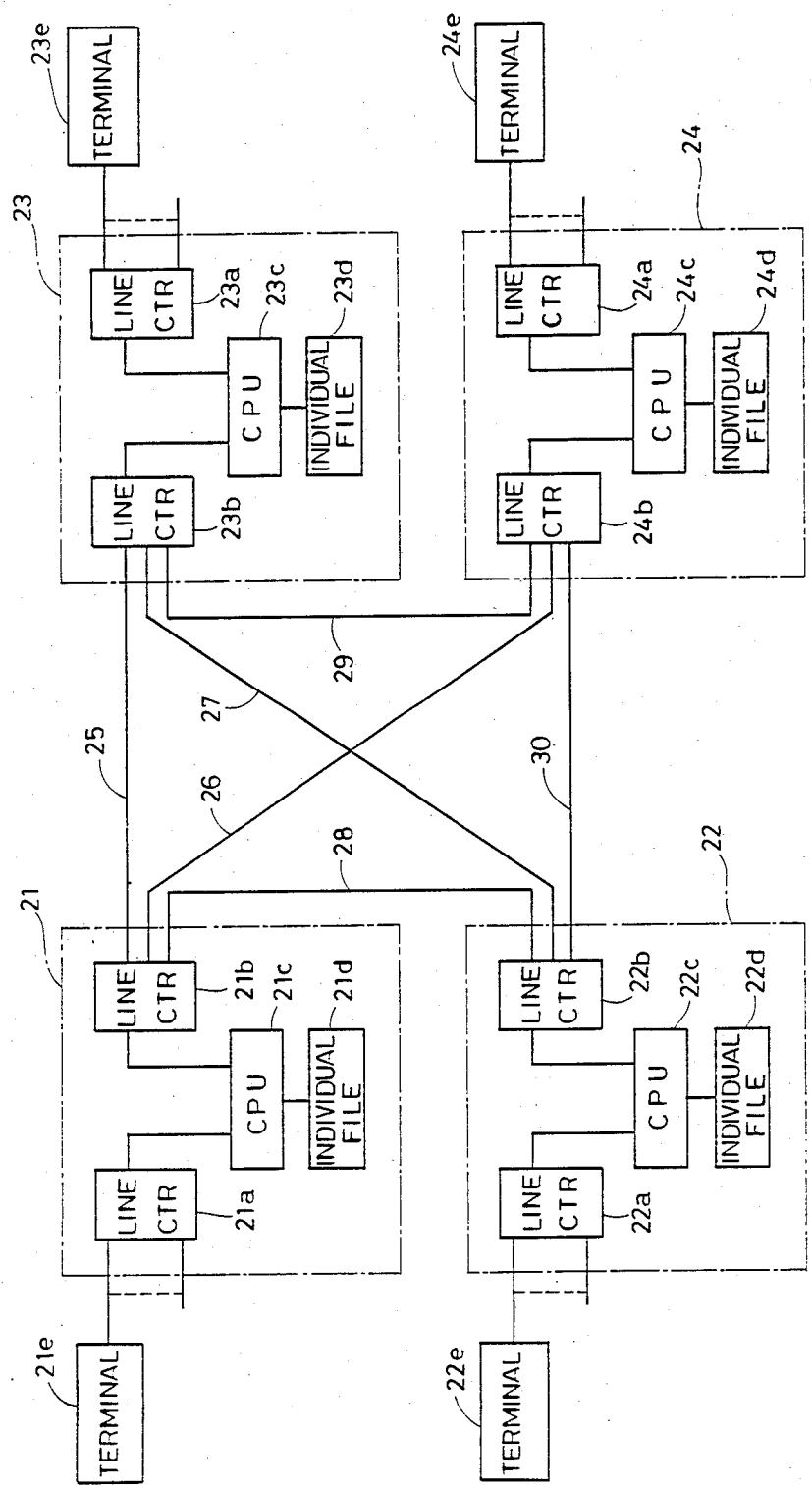
FIG. 7 is a diagram showing a connection between centers in an integrated circuit card system of one embodiment of the present invention.

FIG. 7 is a schematic block diagram explaining the connection between centers in a financial transaction processing system of one embodiment of the present invention. Referring to FIG. 7, the reference numerals 21, 22, 23 and 24 denote centers of banks, respectively, comprising line controls for terminal 21a, 22a, 23a and 24a, line controls among the centers 21b, 22b, 23b and 24b, central processing units 21c, 22c, 23c and 24c, and individual information files 21d, 22d, 23d and 24d, respectively. Each of the centers is connected to a plurality of terminals. For example, the center 21 is connected to a plurality of terminals including a terminal 21e, line connection between each of the terminals and the center 21 is controlled by the line control 21a for a plurality of terminals. The transaction data received from the terminal 21e and the like is provided to the center CPU 21c, which in turn retrieves and renews the individual information file 21d and makes a transaction processing if and when the received transaction data is related to the data concerning transaction with the corresponding bank. If and when the received transaction data is related to the data concerning transaction with another bank, the transaction data is transferred to the other bank by using the line control 21b and communication lines 25, 26 or 28. The center CPU of other bank receiving such transferred transaction data retrieves individual file based on the received data and renews the same and then performs a transaction processing.

Figure 8A:
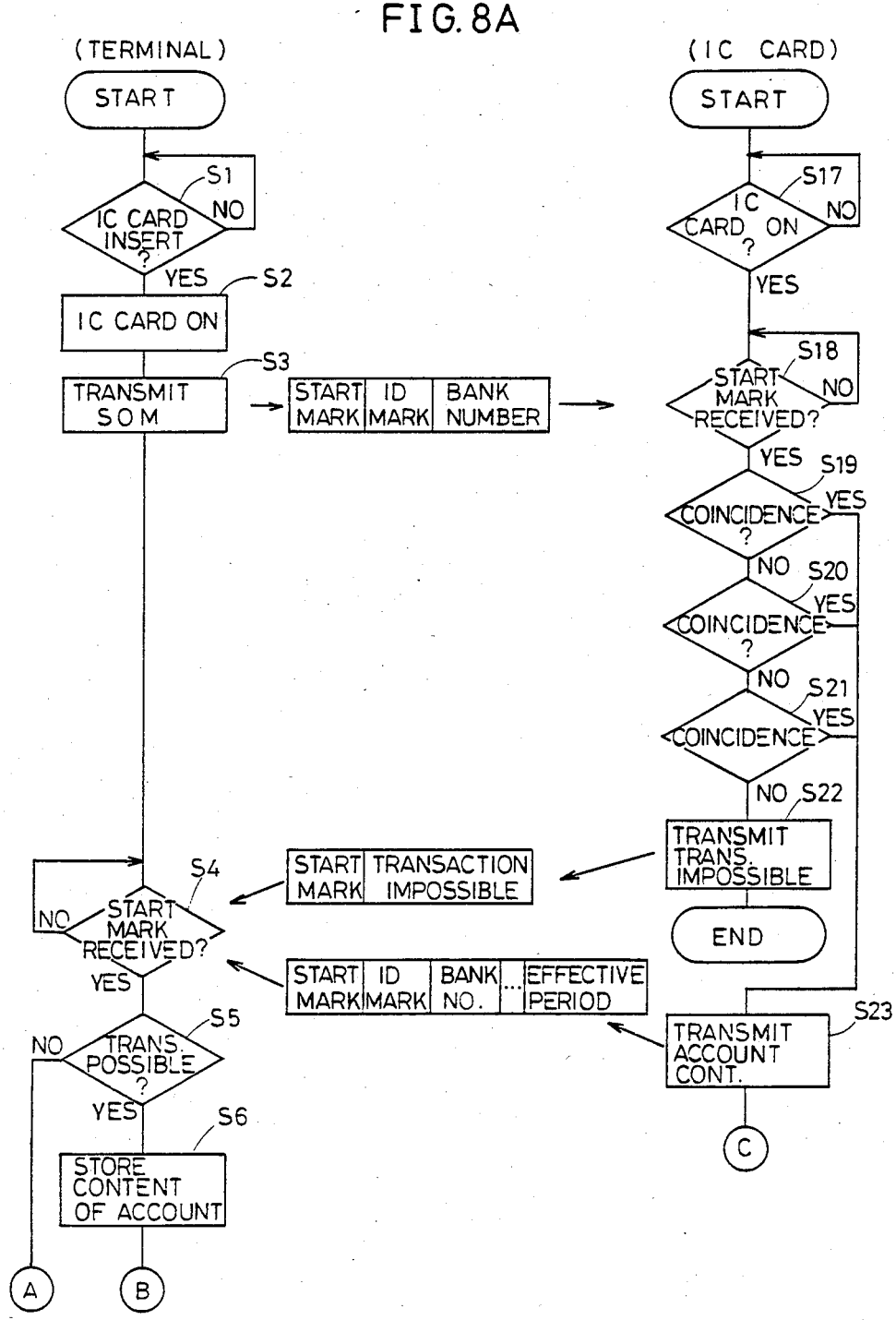
FIG. 8A and 8B are flow diagrams for explaining an operation of a financial transaction processing system of one embodiment of the present invention.
Figure 8B:
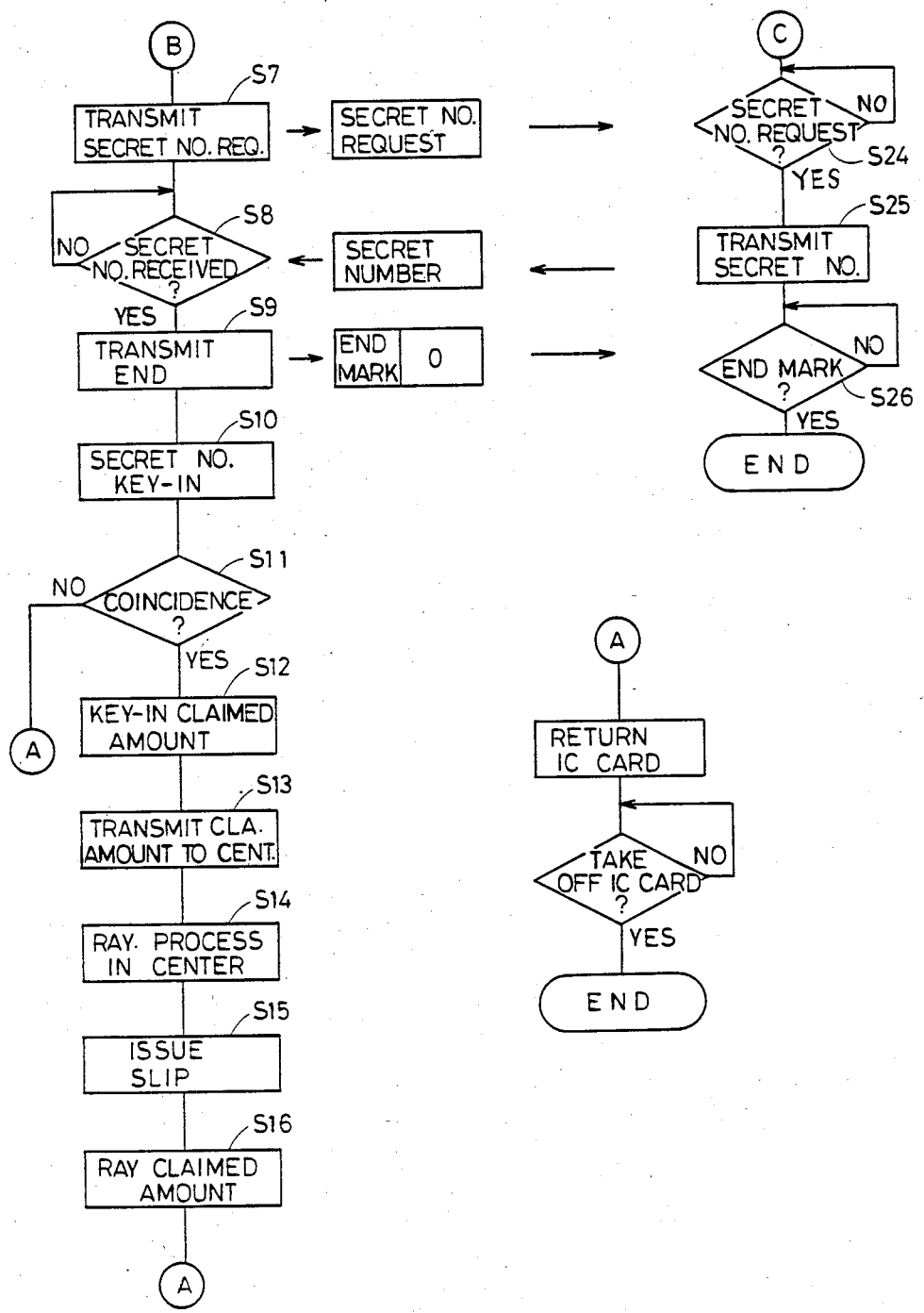

FIGS. 8A and 8B are flow diagrams explaining an example of a specific transaction processing of the financial transaction processing system of one embodiment of the present invention.

Referring to FIGS. 1 to 8B, a specific operation of one embodiment of the present invention will be described.

First, a customer directly goes to a bank where he wishes to make a transaction processing with an IC card as shown in FIGS. 1 to 3. Then, the customer inserts his IC card into a terminal installed in the bank (Step S1). Then, an electric power is supplied to the CPU 1, ROM 2 and RAM 3 of the IC card, through the contacts 5d and 5h, from the terminal (Step S2). Then, the terminal generates a start-of-message (SOM) and sends it to the CPU 1 of the IC card through the contact 5b (Step S3). The start-of-message comprises an inherent identification (ID) mark representative of a bank which the terminal belongs to and a bank number. The IC card, which received such start-of-message (Step S18), sequentially collates the ID mark and the bank number included in the received start-of-message with ID marks and bank numbers of the first to the n-th transaction accounts which are stored in the storage areas of the ROM 2 shown in FIG. 3 (Steps S19, S20 and S21). As a result, if and when it is determined that the account specified by the ID mark and the bank number corresponding to the ID mark and the bank number included in the received start-of-message does not exist in the detailed data specifying a plurality of financial body's accounts stored in the ROM 2 of the IC card (Step S21), the CPU 1 generates a signal indicative of an impossible transaction in accordance with the program stored in the ROM 2 and transmits the signal to the IC card reader 9 of the terminal (Step S22). If and when it is determined that the corresponding account specified by the ID mark and the bank number included in the received start-of-message exists in a plurality of accounts stored in the ROM 2 (Step S21), the CPU 1 reads out all of the data of this account, such as account number, effective time period and the like and transmits the data to the terminal (Step S23).

In such a way, the terminal receiving a message indicating an impossible transaction or a message including a corresponding account data transmitted from the IC card (Step S4) indicates to a customer that the transaction required by him, is impossible by returning his IC card to him if and when the received message indicates an impossible transaction (Step S5), and stores the received account data (Step S6) if and when the received message includes the detailed data of a corresponding account.

In the terminal, the main control 8 generates a message requesting a secret number and transmits the message to the CPU 1 of the IC card (Step S7). The IC card receiving such transmitted message determines whether the received message requests a secret number (Step S24) and if so, the IC card reads out a secret number common to all of the accounts shown in the memory map in FIG. 3 and transmits the secret number to the IC card reader of the terminal (Step S25). When the terminal receives such secret number, the main control 8 determines whether the received message is a secret number or not (Step S8) and if the received message is a secret number, the main control 8 generates an end mark indicating that all of communication is terminated and transmits the end mark to the CPU 1 of the IC card (Step S9). In the IC card receiving such end mark, it is determined whether the received message is an end mark or not (Step S26) and if so, all of communication is terminated.

The subsequent operation on the terminal side is the same as in a usual cash card. First, a secret number is entered to a terminal by a customer using a keyboard 20 (Step S10) and the main control 8 determines whether the entered secret number coincides with the received secret number from the above described IC card (Step S11). If and when the entered secret number does not coincide with the received secret number from the IC card, the IC card is returned to a customer and the transaction is made impossible. If and when both secret numbers coincide with each other, an amount as claimed for payment is entered into the terminal by a customer using the keyboard 20 (Step S12). The detailed data of the corresponding account read out from the IC card, which is now stored in the terminal, and the claimed amount as entered are transmitted to a center of a bank which the terminal belongs to (Step S13), in which a center file is retrieved and renewed in accordance with the transmitted data and an instruction indicating permission of payment is provided to the terminal (Step S14). The terminal receiving such instruction directs the slip issuing machine 12 to issue a payment slip (Step S15) and directs the paper discharging machine 13 to dispense the cash to a customer (Step S16). After completion of payment to a customer, the IC card is returned to a customer and the transaction is terminated.

Figure 9A:
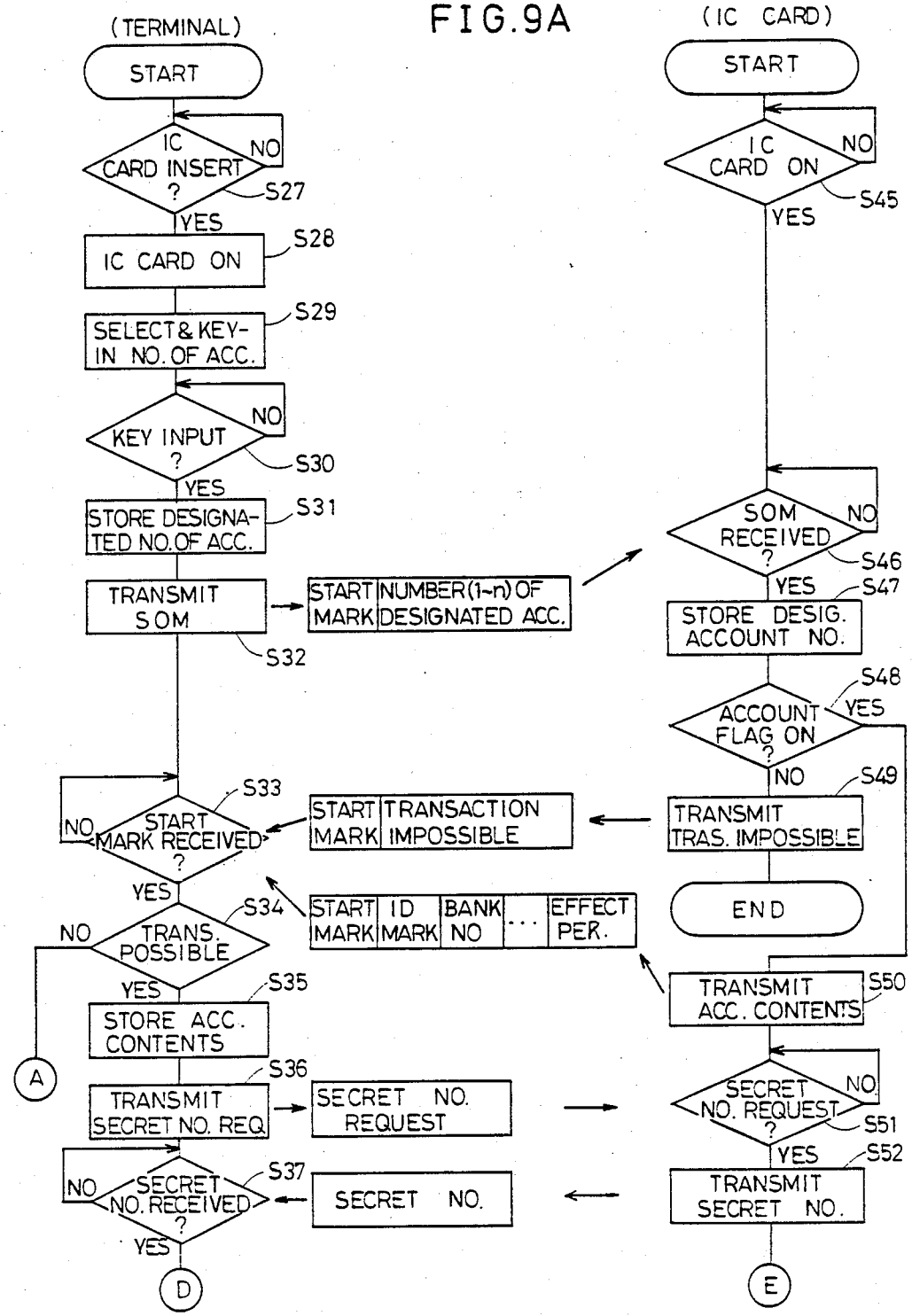
FIGS. 9A and 9B are flow diagrams explaining an operation of a financial transaction processing system of another embodiment of the present invention.
Figure 9B:
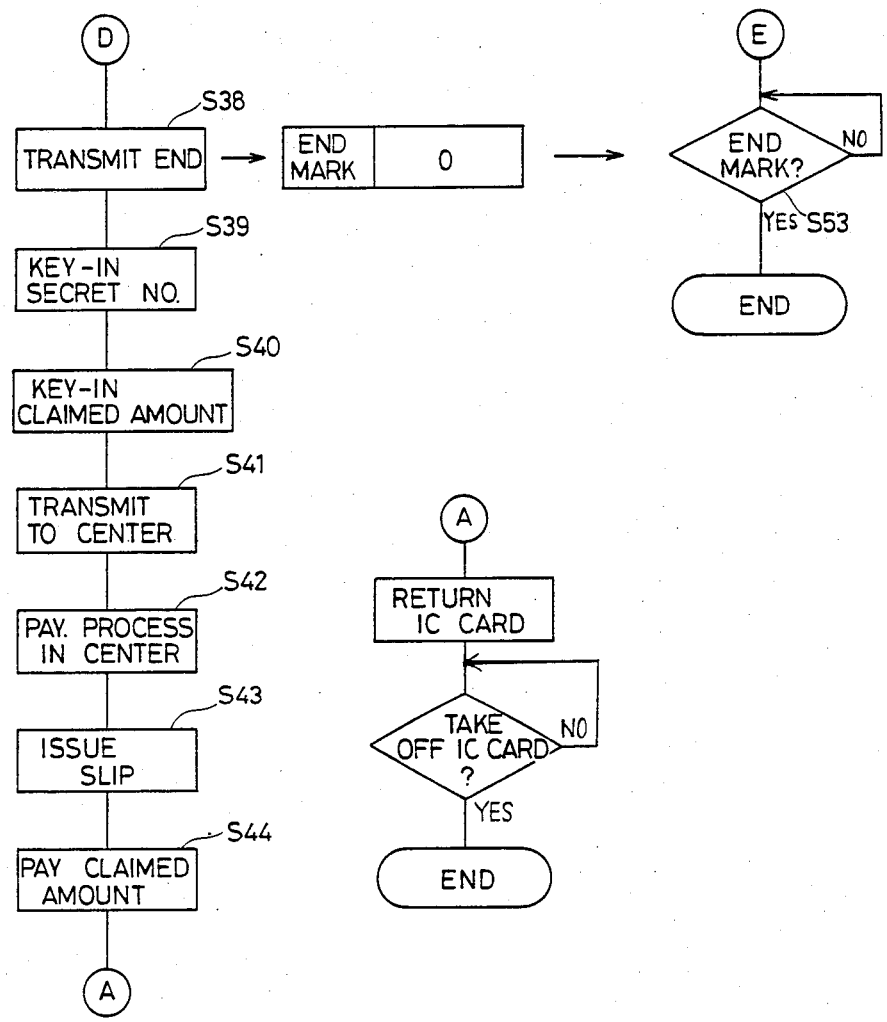

FIGS. 9A and 9B are flow diagrams explaining a specific operation of a financial transaction processing system in which a desired account is selected from a plurality of accounts stored in an integrated circuit card, by using a terminal so that a transaction is made.

Now, referring to FIGS. 1 to FIG. 9B, an operation of a financial transaction processing system of one embodiment of the present invention will be described.

First, a customer goes to a bank with an integrated circuit card shown in FIGS. 1 to 3. Since selection of an account can be made by operation of a terminal, the bank is not necessarily a bank that he directly makes a transaction with. The customer inserts his IC card into a terminal installed in the bank (Step S27). Then, an electric power is supplied to the CPU 1, ROM 2 and RAM 3 included in the IC card shown in FIG. 1 (Step S28). In the terminal, the main control 8 makes the CRT 19 display that number of account is to be selected and entered so that a customer is informed to the effect (Step S29). Meanwhile, the "number of account" refers to the number of 1 to n labeled for each of a plurality of accounts stored in the storage areas of the ROM 2 of the IC card, as shown in a memory map of FIG. 3 and it is assumed that the customer knows the name of bank of the account corresponding to the number.

Then, the customer enters into the terminal the number corresponding to the bank account which he wishes, in accordance with the indication by the CRT 19, using the keyboard 20 (Step S30). The number of the account as entered, which is any of the numbers of 1 to n, is stored in the terminal (Step S31) and then is transferred to the CPU 1 of the IC card through the contact 5b, together with a start mark as a start-of-message (Step S32). In the IC card receiving such message, it is determined whether the received message is a start-of-message or not (Step S46) and if it is a start-of-message, the number of the designated bank account is stored in the RAM 3 (Step S47). Then, the CPU 1 determines whether an account flag in the ROM 2, corresponding to the number of the account is set or not (Step S48) and if it is not set, the CPU 1 generates a signal indicating an impossible transaction in accordance with the program stored in the ROM 2 and transmits the signal to the IC card reader 9 of the terminal (Step S49). If and when it is determined that the corresponding account flag is set, the CPU 1 reads out all of the detailed account content data, such as account number and effective time period and transmits the data to the IC card reader 9 of the terminal (Step S50). The terminal receiving an impossible transaction indicating message or an account content message (Step S33), shows a customer that the transaction required by him is impossible by returning the IC card to him if the message transmitted from the IC card indicates an impossible transaction (Step S34), and the terminal stores the data of account contents if and when the message transmitted from the IC card is the detailed data of the account content (Step S35).

In the terminal, the main control 8 generates a message requesting a secret number and transmits the message to the CPU 1 of the IC card (Step S36). In the IC card receiving such message, it is determined whether the received message requests a secret number or not (Step S51) and if it requests a secret number, a secret number common to all of the accounts shown in the memory map of FIG. 3 is read out and transmitted to the IC card reader 9 of the terminal (Step S52). In the terminal, it is determined whether the received message is a secret number or not (Step S37), and if it is a secret number, an end mark indicating that all of communication is to be terminated is transmitted to the CPU 1 of the IC card (Step S38). In the IC card receiving the end mark, it is determined whether the received message is an end mark or not (Step S53) and if it is an end mark, all communication is terminated.

All of the subsequent operation on the terminal side is substantially the same as the operation in the terminal in the embodiment shown in FIG. 8. However, determination of coincidence between the key-inputted (Step S39) secret number and the secret number received from the IC card is not made in the terminal and the secret number is transmitted to the center together with a payment-claimed amount and the like (Step S41) and then in the center, coincidence of the secret number is made.

As described in the foregoing, according to this embodiment, an integrated circuit card in which the data specifying a plurality of transaction accounts corresponding to a plurality of financial bodies can be used and in making a transaction, a customer directly goes to a bank or operates a terminal to select a desired financial body so that a desired transaction can be made. Accordingly, a customer simply own a single integrated circuit card so that complexity of handling and storing a card can be reduced.

Figure 10A:
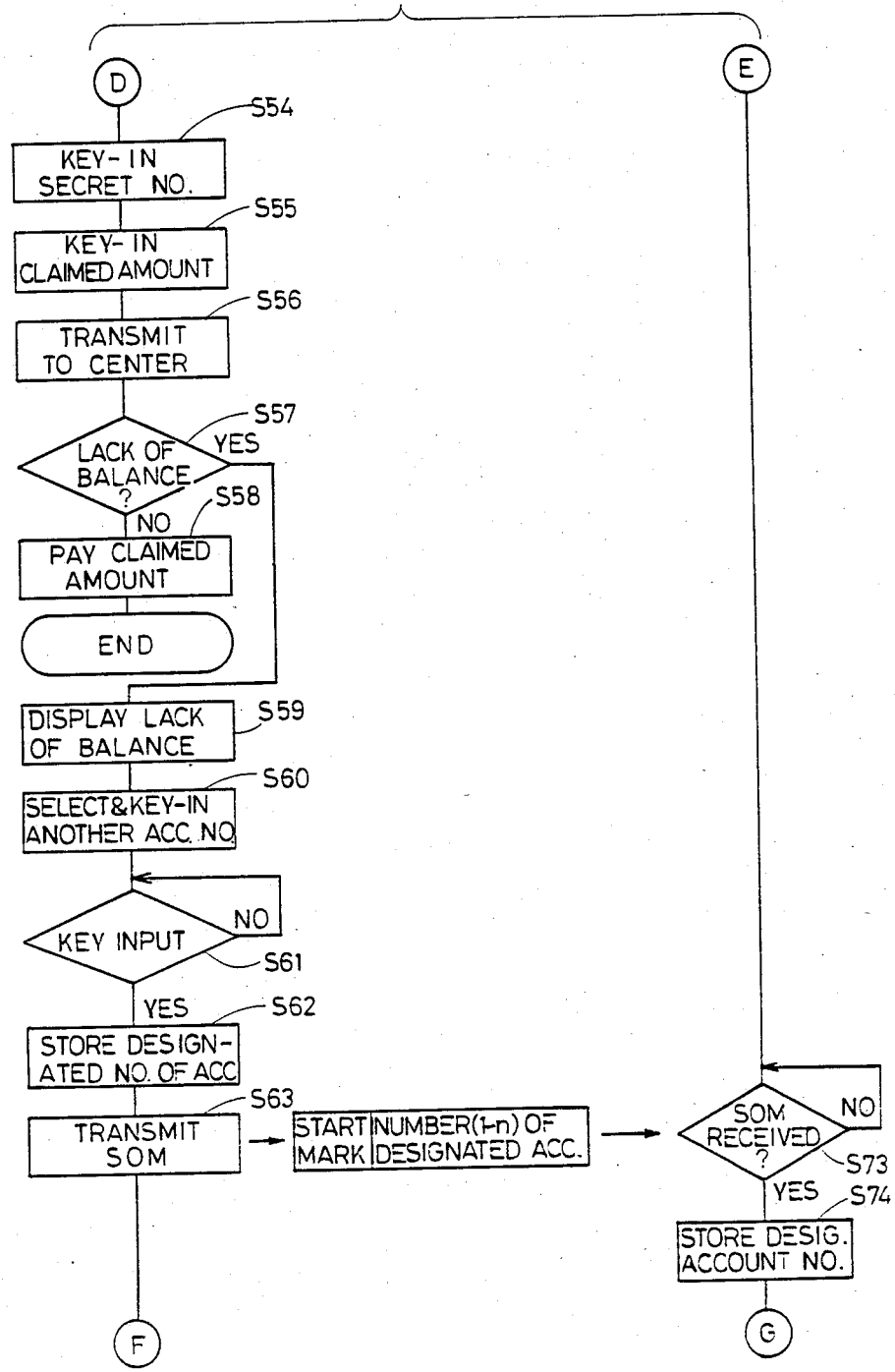
FIGS. 10A and 10B are flow diagrams explaining an operation of a financial transaction processing system of another embodiment of the present invention.
Figure 10:
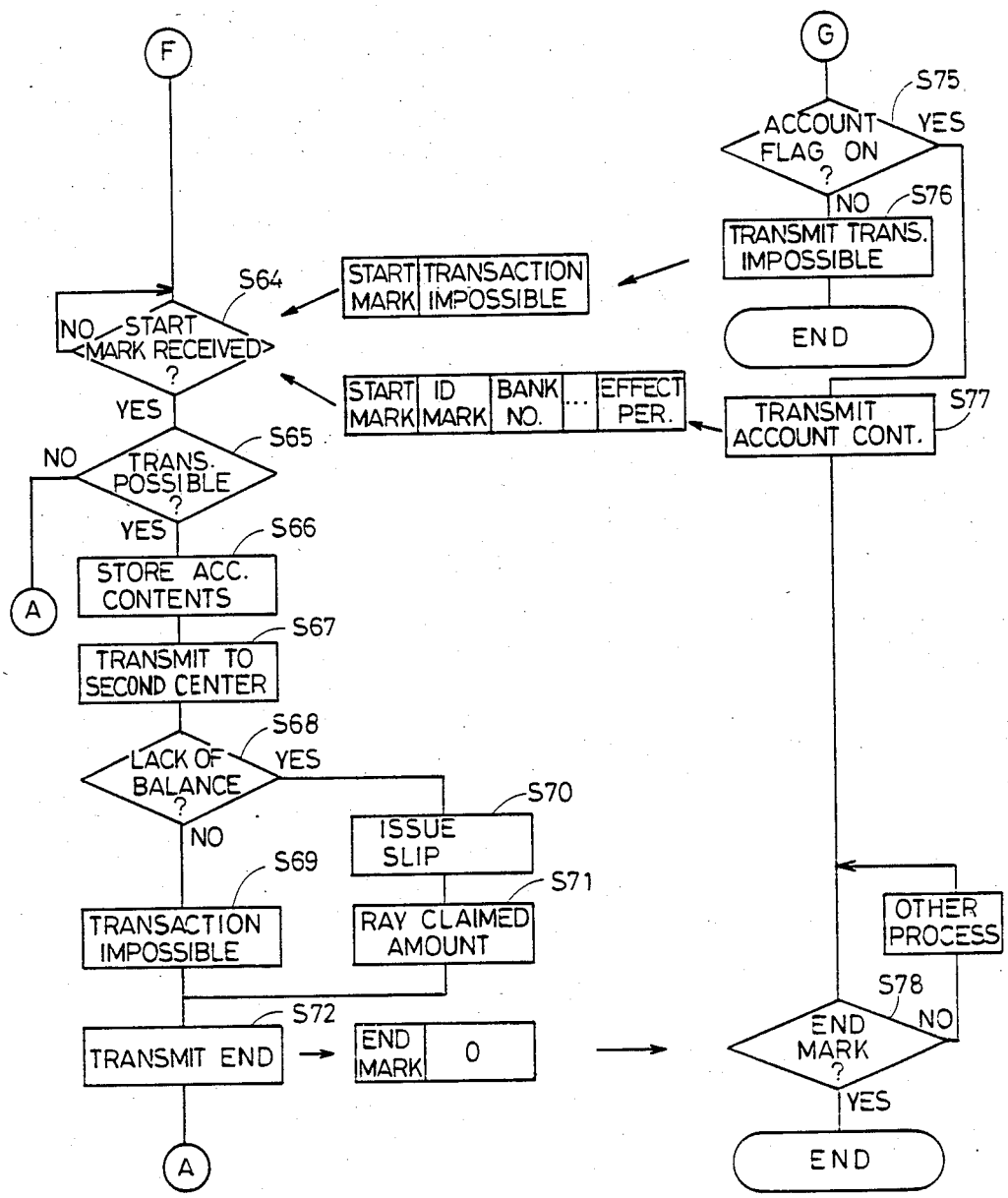

FIGS. 10A and 10B are flow diagrams explaining an operation of a financial transaction processing system of other embodiment of the present invention. The former operation of this embodiment is exactly the same as the operation shown in FIG. 9A and hence description thereof is omitted. Accordingly, FIGS. 10A follows FIG. 9A and hence the additional operation beginning from the step S54 in FIG. 10A will be described. In the terminal, it is determined whether the received message is a secret number or not and if it is a secret number, a secret number is entered into the terminal by a customer using a keyboard 20 (Step S54). Thereafter, the customer also enters a claimed amount into the terminal using the keyboard 20 (Step S55). Then, the detailed data of the corresponding account read out from the IC card, which is now stored in the terminal, the claimed amount, and the secret number entered through key-input are transmitted to a center of a bank, for example, the first center, which the corresponding account belongs to (Step S56) and, in the first center an, individual file is retrieved in accordance with these data and it is determined whether the claimed amount is less than the account balance or not (Step S57). As a result, if and when the claimed amount is not over the account balance, the claimed amount is paid (Step S58) and then the transaction is completed. If and when the claimed amount is over the balance, the terminal indicates lack of account balance to a customer by means of CRT 19 (step S59). Furthermore, the terminal instructs a customer to select the number of account other than the number of the first account and to key-input the selected number (Step S60) and the number of the account key-inputted by a customer (Step S61) is once stored in the terminal (Step S62) and transmitted to the CPU 1 of the IC card through the contact 5B, together with a start mark as a start-of-message (Step S63). The IC card receiving such message determines whether the received message is a start-of-message or not (Step S73) and if it is a start-of-message, the number of the bank account as designated is stored in the RAM 3 (Step S74). Then, the CPU 1 determines whether the account flag in the ROM 2, corresponding to the number of the account, is set or not (Step S75) and it is not set, the CPU 1 generates a singal indicating an impossible transaction in accordance with the programs stored in the ROM 2 and transmits the signal to the IC card reader 9 of the terminal (Step S76). If and when the corresponding account flag is determined to be set, the CPU 1 reads out the detailed data of the account content such as the account number and effective time period of this account and transmits the same to the IC card reader 9 of the terminal (Step S77). The terminal receiving such an impossible transaction indicating message or an account content message indicates an impossible transaction to a customer by returning the IC card to him if and when the message transmitted from the IC card indicates an impossible transaction (Step S65), and the terminal stores all of the account contents if and when the message transmitted from the IC card includes detailed data of account contents (Step S66).

The detailed data of the corresponding account read out from the IC card, which is now recorded in the terminal, and the claimed amount and the secret number as key-inputted are transmitted to a center (the second center) of a bank which the corresponding account belongs to (Step S67) and, in the second center, an individual information file is retrieved in accordance with such data and it is determined whether the claimed amount is over the account balance. As a result, if and when the claimed amount is over the account balance, the terminal indicates an impossible transaction to a customer (Step S69) and if and when the claimed amount is not over the account balance, an instruction indicating permission of payment is provided to the terminal. The terminal receiving such instruction directs the slip issuing machine 12 to issue a payment slip (Step S70) and the paper discharging machine 13 to dispense a cash to a customer (Step S71). Then, the terminal generates an end mark indicating the all of the communication is to be terminated and transmits the end mark to the CPU issue of the IC card (Step S70). In the IC card receiving the end mark, it is determined whether the received message is an end mark or not (Step S78) and if it is an end mark, all communication is terminated. After completion of payment to a customer, the IC card is returned to a customer and the transaction is completed.

Figure 11:
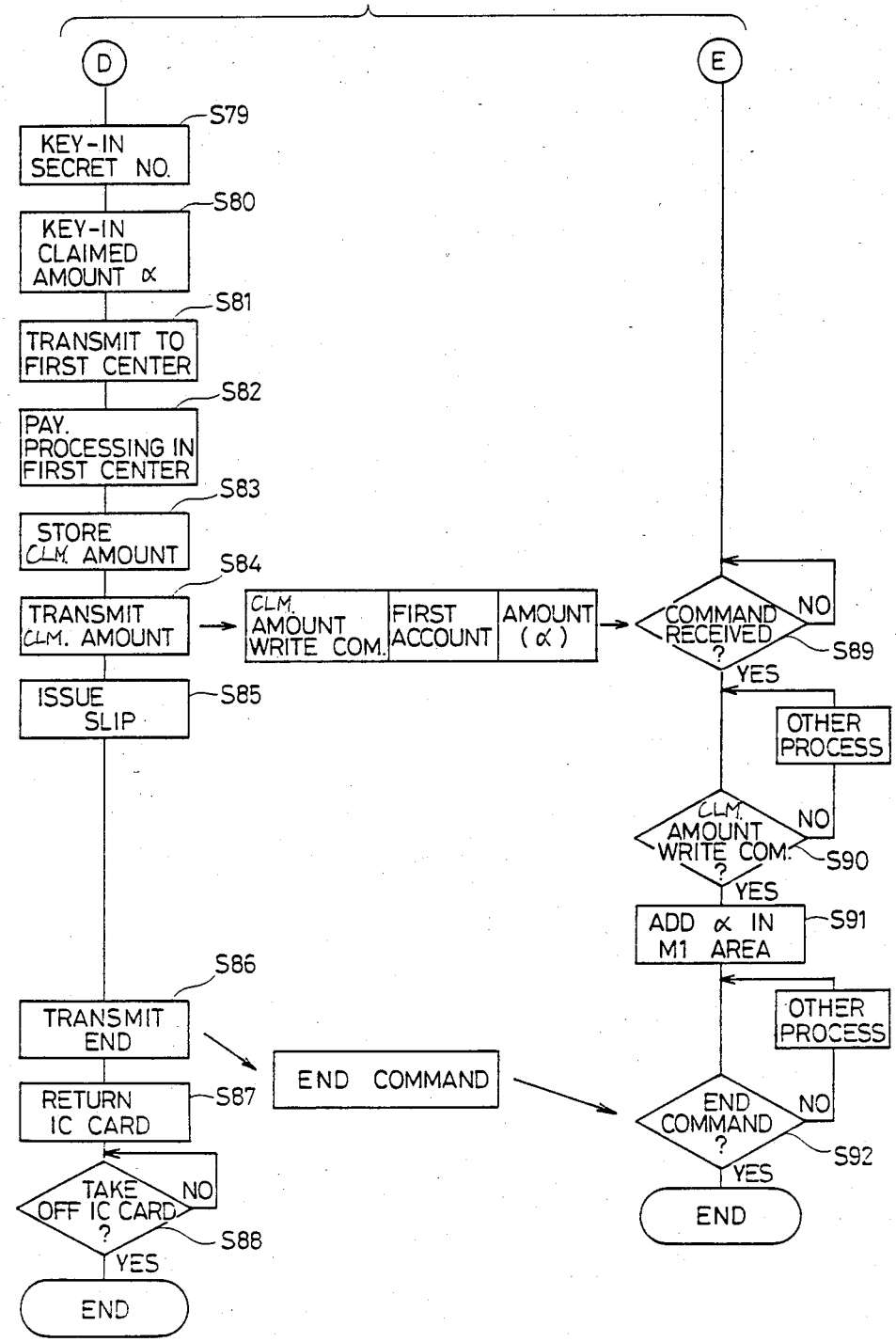
FIG. 11 is a flow diagram explaining an operation of a financial transaction processing system of another embodiment of the present invention.

As described in the foregoing, according to this embodiment, if and when lack of balance in the selected account occurs, another account can be selected from the customer's remaining accounts so that the desired transaction can be performed. Accordingly, a customer needs not to retry a transaction processing from the beginning even in the situation of the lack of balance, and hence efficiency of operating a terminal can be improved. FIG. 11 is a flow diagram explaining a specific operation for payment processing in a center and for storage of claimed amount information to an integrated circuit card, in a financial transaction processing system of one embodiment of the present invention.

The former operation of this embodiment is exactly the same as the operation shown in FIG. 9A and hence the description thereof is omitted. Accordingly, FIG. 11 follows FIG. 9A and hence only the additional operations beginning from the step S79 in FIG. 11 will be described.

In the terminal, it is determined whether the received message is a secret number or not and if it is a secret number, the main control 8 directs the CRT 19 to indicate to a customer that a secret number should be entered by using a keyboard 20. In accordance with this instruction, the customer key-inputs his secret number to the terminal (Step S79). Then, the terminal again indicates key-inputting of a claimed amount to a customer and, correspondingly a customer key-inputs desired claimed amount $\alpha$ (Step S80). Then, the detailed data of the corresponding account read out from the IC card, which is now stored in the terminal, and the secret number and the claimed amount $\alpha$ as key-inputted are transmitted to a center of a bank which the terminal belongs to and, in addition, such data is transferred to the first center, for example, which the corresponding account belongs to, through a communication line between centers (Step S81). In the center a, file is retrieved in accordance with the data and is renewed and then, payment processing is completed. The payment amount, the payment processing of which was already terminated, is again provided to the terminal (Step S83) and such claimed amount is transmitted to the IC card as a claimed amount writing command (Step S84). The claimed amount writing command includes the number designating the corresponding account (for example, first account in this embodiment) and a claimed amount $\alpha$. In the IC card receiving such command, the CPU 1 determines whether the received message is such a command (Step S89), and particularly, a claimed amount writing command (Step S90) and, if it is a claimed amount writing command, the claimed amount $\alpha$ is stored in an area M1 for claimed amount of the first account in the RAM storage area of the IC card in FIG. 4 (Step S91). On the other hand, in the terminal, after transmission of the claimed amount (Step S84), the slip issuing machine 12 is instructed to issue a payment slip (Step S85) and thereafter, a end command is transferred to the IC card (Step S86). In the IC card receiving the ending command, it is determined whether the received message is an end command or not (Step S92), and if it is an end command, the communication is terminated and the terminal returns the IC card to a customer (Step S87 and Step S88). As described in the foregoing, payment processing in the center and storage processing of claimed amount to the IC card are completed. As a result, the limited amount to be claimed after payment processing in the center is stored in the IC card, but the cash is not actually paid to the customer.

Figure 12:
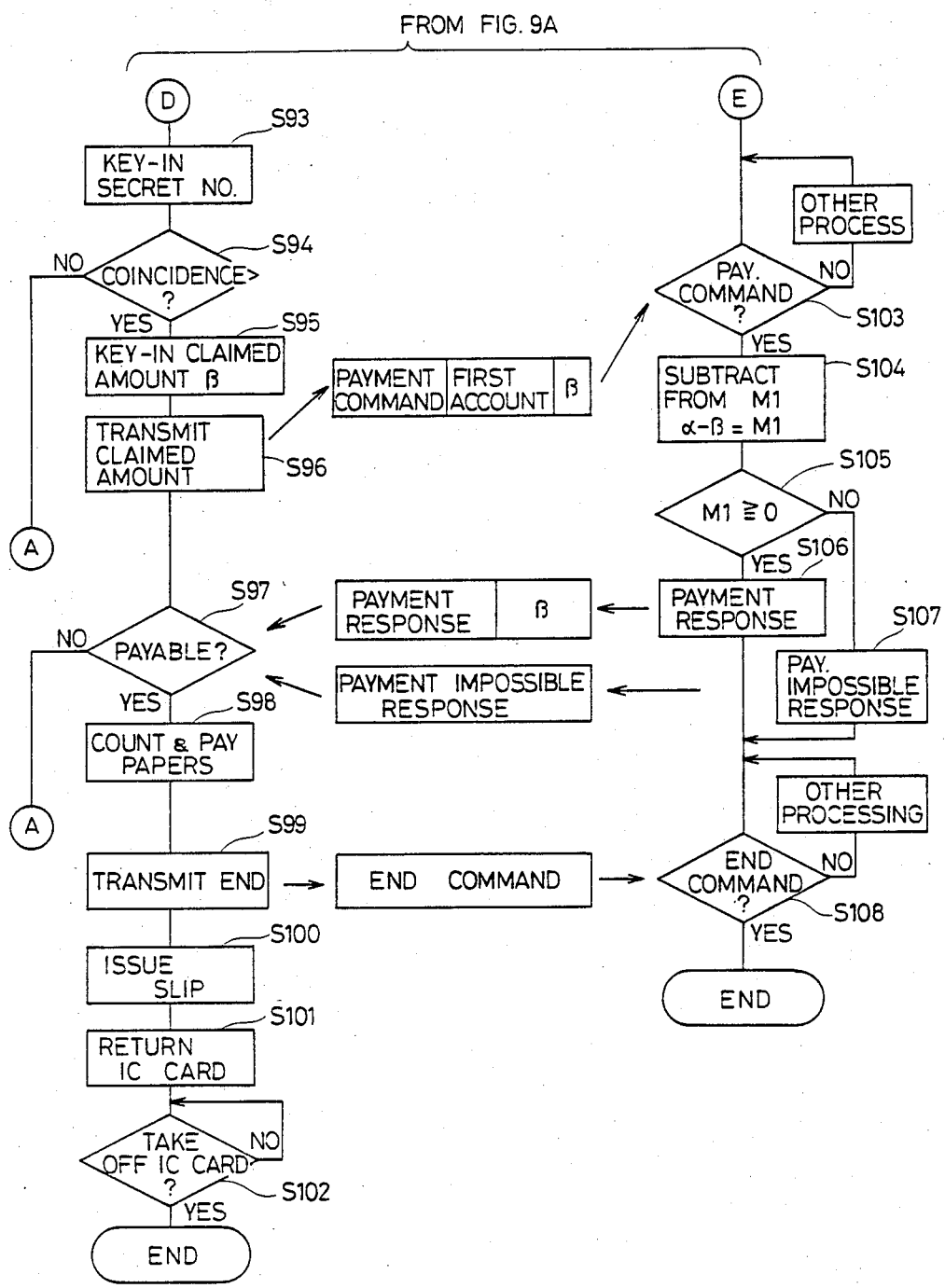
FIG. 12 is a flow diagram explaining an operation of a financial transaction processing system of another embodiment of the present invention.

FIG. 12 is a flow diagram explaining a specific operation for making an actual payment in an offline manner of a terminal, by using an integrated circuit in which the limit amount $\alpha$ to be claimed is stored in accordance with the processing procedures shown in FIG. 11.

Referring to FIGS. 1 to 12, a specific operation for payment processing of a financial transaction processing system of one embodiment of the present invention will be described.

A customer who completed payment processing in the center and storing processing of the limited amount α to be claimed to an integrated circuit card in accordance with processing procedures shown in FIG. 11, can make a transaction in an offline manner of a terminal, as necessary, with the integrated circuit card, even if an operating time period of an online system has passed.

First of all, the customer goes to the location where a terminal is installed, with an integrated circuit in which a limit amount α to be payment-claimed is stored. Selection of an account which the customer wishes to use is made by operation of the terminal and hence the terminal is not necessarily a terminal of a bank that the customer wishes to directly make the transaction with. Then, the customer inserts his integrated circuit card into the terminal. The subsequent operation is performed in accordance with the flow diagram shown in FIG. 9A, followed by the flow diagram shown in FIG. 12. Accordingly, the description of operation of FIG. 9A is omitted and additional new operation beginning from the step S93 in FIG. 12 will be described.

First, the main control 8 determines whether the secret number key-inputted by a customer (Step S93) coincides with the secret number received from the integrated circuit card (Step S94). If and when both secret numbers are not coincident with each other, the IC card is returned to a customer and the subsequent transaction is inhibited or is made impossible and if and when both secret numbers are coincident with each other, the customer should key-input a claimed amount β by using a keyboard (Step S95). The claimed amoun β as key-inputted is transmitted to the IC card as a payment command, together with the number designating the corresponding account (the first account in this example) (Step S96). In the IC card receiving such payment command, it is determined whether the received message is a payment command or not (Step S103) and if it is a payment command, the claimed amount β is subtracted from the limit amount β to be claimed, which is stored in an area M1 for deposit in storage areas of RAM of the IC card shown in FIG. 4 (Step S104). Then, it is determined whether the difference M1 is positive or not by the CPU 1 (Step S105) and if it is positive, the desired amount β claimed is determined to be less than the limit amount β and thus a response for permission of payment is generated and transmitted to the terminal (Step S106). If and when the difference M1 is negative, it is determined that the claimed amount β is not less than the limit amount α and thus a response indicating that the payment is not permitted is generated and transmitted to the terminal (Step S107). In the terminal receiving such payment permitting response or a payment not-permitting response, the main control 8 directs the paper discharging machine 13 to count papers corresponding to the claimed amount α and to dispense the correspond cash to a customer, if and when the message transmitted to the IC card is a payment permitting response (Step S98). If and when the message transmitted from the IC card is a payment not-permitting response, the terminal indicates an impossible transaction to a customer by returning the IC card to him (Step S97).

Subsequently, the terminal generates an end command indicating that all communication is to be terminated and transmits the command to the CPU 1 of the IC card (Step S99). In the IC card receiving the end command, it is determined whether the received message is an end command or not (Step S108) and if it is an end command, all communication is terminated. Then, the terminal directs the slip issuing machine 12 to issue a payment slip (Step S100) and thereafter, the IC card is returned to the customer and the offline transaction in the terminal is terminated (Steps S101 and S102).

As described in the foregoing, according to the present embodiment, an integrated circuit card in which the data specifying a plurality of transaction accounts corresponding to a plurality of financial bodies can be used and in making a transaction processing, a desired amount as claimed can be stored in the IC card by designating a desired financial body through an operation of terminal and at the same time, the payment processing in the center can be made to be completed.

Accordingly, a customer can obtain cash from his account through an offline transaction of a terminal even if an operating time period of online system in a bank has passed, whereby a person needs not have to carry excess cash and unfair use caused due to delay of payment processing in the center can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. A financial transaction processing system comprising:
   an integrated circuit card for use in financial transaction processing, said integrated circuit card including first data storage means having storage area for storing data specifying a plurality of transaction accounts corresponding to a plurality of financial institutions; and
   a terminal for communicating with said integrated circuit card, said terminal including account designating means for designating a specific account which a customer wishes to use, out of said plurality of transaction accounts corresponding to the plurality of financial institutions;
   said integrated circuit card further including transaction data outputting means responsive to said account designating means for reading out data specifying the account designated by said account designating means from the data specifying transaction accounts corresponding to said plurality of financial institutions stored in said storage area and for transmitting the read data to said terminal.

2. A financial transaction processing system in accordance with claim 1, which further comprises
   a center apparatus provided for each of said plurality of financial institutions, and wherein
   said terminal further includes
      claimed amount information entering means for entering information concerning a first claimed amount, and
      transaction data transmitting means for transmitting said first claimed amount information and said designated account specifying data to the center apparatus which said designated account belongs to, said center apparatus includes
- a center file for storing information associated with related accounts, including balance information of the related accounts, and
- account balance collating means for determining whether said first claimed amount is less than the balance of said designated account stored in said center file and for transmitting a signal indicating lack of balance when the first claimed amount is more than the balance, and said terminal further includes
- instructing means responsive to said lack-of-balance-indicating signal for instructing a customer to designate a new account from said plurality of transaction accounts except for said designated account, using said account designating means.

3. A financial transaction processing system in accordance with claim 1, which further comprises
- a center apparatus provided for each of said plurality of financial institutions, and wherein said integrated circuit card further includes second data storage means which is writable and readable and having a storage area at least for amount information, said terminal further includes
- claimed amount information entering means for entering first claimed amount information,
- transaction data transmitting means for transmitting said first claimed amount information and data specifying said designated account to a center apparatus which said designated account belongs to, and
- writing means for writing said first claimed amount information and said designated account specifying data into said storage area of said second storage means, and said center apparatus further includes
- a center file for storing information associated with related accounts, including balance information of the accounts included in the file, and
- payment processing means responsive to said first claimed amount information received from said transaction data transmitting means and said designated account specifying data for making payment processing based on the balance of said designated account stored in said center file.

4. A financial transaction processing system in accordance with claim 3, which further comprises
- a cash dispensing terminal for communicating with said integrated circuit card having said storage area of said second data storage means in which said first claimed amount information and said designated account specifying data are stored, said cash dispensing terminal including entering means for entering a second claimed amount, and wherein
- said integrated circuit card further includes means for comparing said second claimed amount as entered with said first claimed amount information stored in said storage area of said second data storage means for providing a payment instruction instructing said cash dispensing terminal to dispense the cash corresponding to the second claimed amount when said second claimed amount is less than said first claimed amount.

5. A financial transaction processing system in accordance with claim 1, wherein
- said integrated circuit card further includes impossible transaction indicating signal outputting means for generating a signal indicating an impossible transaction and sending it to said terminal when the account designated by said account designating means is not included in the transaction accounts for said plurality of financial institutions stored in said storage area.

6. A financial transaction processing system in accordance with claim 1, wherein
- said account designating means designates, from said plurality of transaction accounts corresponding to said plurality of financial institutions, the specific account of specific financial institutions which said terminal belongs to.

7. A financial transaction processing system in accordance with claim 1, wherein
- said account designating means further includes means for selecting and designating a desired account from said plurality of financial institution transaction accounts.

8. A financial transaction processing system in accordance with claim 1, wherein
- said first data storage means further includes a storage area for storing a single secret number information common to said plurality of financial institutions.

* * * * *